May 6, 1952 L. D. SACRE 2,595,984
TUNING MECHANISM
Filed Aug. 20, 1945 7 Sheets-Sheet 2

INVENTOR.
Leo D. Sacre
BY
Att'ys.

May 6, 1952  L. D. SACRE  2,595,984
TUNING MECHANISM
Filed Aug. 20, 1945  7 Sheets-Sheet 6

INVENTOR.
Leo D. Sacre
BY
Att'ys.

May 6, 1952      L. D. SACRE      2,595,984

TUNING MECHANISM

Filed Aug. 20, 1945      7 Sheets-Sheet 7

INVENTOR.
Leo D. Sacre
BY
Att'ys

Patented May 6, 1952

2,595,984

UNITED STATES PATENT OFFICE 2,595,984

TUNING MECHANISM

Leo D. Sacre, Park Ridge, Ill., assignor to Motorola, Inc., a corporation of Illinois Application August 20, 1945, Serial No. 611,588

7 Claims. (Cl. 192—142)

The present invention relates to control apparatus and more particularly to an improved mechanism for moving the tuning shaft of tunable wave signalling apparatus to any one of a number of predetermined settings within a predetermined rotational range. Specifically, this invention relates to improvements in apparatus of the character disclosed in Elliott Patent No. 2,249,753, granted July 22, 1941.

It is an object of the present invention to provide an improved mechanism for automatically tuning tunable wave signaling apparatus, such, for example, as a radio receiver, which is compact in arrangement, is of simple and inexpensive construction and is positive and reliable in operation.

It is another object of the invention to provide an improved mechanism of the character described which is automatically operable to move a tuning shaft with exact precision to any selected one of a number of predetermined settings within the rotational range of the shaft.

According to a further and more specific object of the invention, there are provided, in an electrified push button tuning mechanism of the type utilizing shaft stopping only during rotation of the shaft in one direction, improved facilities for determining the stop points, i. e. the points corresponding to the predetermined shaft settings, with precision accuracy.

It is a still further object of the invention to provide in a mechanism of the character described, an improved and exceedingly simple control unit for determining one of settings of the tuning shaft with precision accuracy.

The invention, both as to its organization and method of operation, together with further objects and advantages thereof, will best be understood by reference to the following specification taken in connection with the accompanying drawings, in which:

Figure 1:
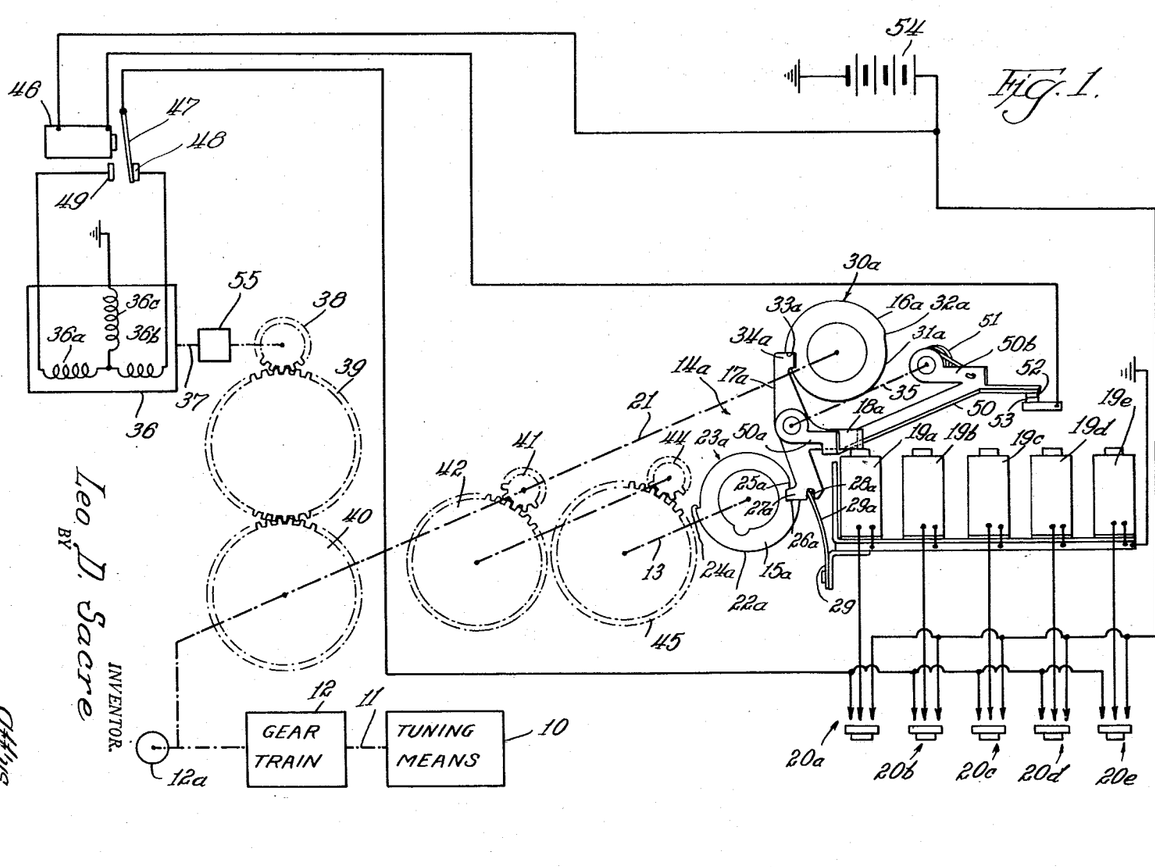
Fig. 1 schematically illustrates an improved tuning mechanism characterized by the features of the present invention.

Referring now to the drawings, and more particularly to Fig. 1 thereof, the present improved mechanism is there illustrated in its use to impart any one of a number of predetermined angular settings to the settable shaft 11 of adjustable tuning means 10 which may be electrically included in tunable wave signaling apparatus such, for example, as a conventional radio broadcast receiver. The tuning means may comprise the usual gang-connected condensers, through adjustment of which the receiver is selectively tuned to receive different signals within a predetermined frequency band. These condensers may be of the conventional 180 degrees type, such that the tuning shaft 11 has a 180 degree rotational range between the limits thereof. This tuning shaft is connected through the usual gear train 12 to the output shaft 21 of the present improved tuning mechanism, which gear train serves to convert high speed rotation of the shaft 13 into low speed rotation of the tuning shaft 11, with a predetermined speed ratio therebetween. Manual adjustment of the tuning means 10 to settings other than those automatically obtainable through operation of the tuning mechanism, may be effected through operation of a tuning knob 12a carried by the shaft 21.

In brief, the present improved tuning mechanism comprises a reversible driving motor 36 arranged to drive the tuning shaft 11 in either direction to any setting within its rotational range through a driving connection which comprises a slip clutch 55 and reduction gears 38, 39 and 40. Reverse rotation of the motor 36 is obtained through selective energization of its two field windings 36a and 36b in series with its motor armature winding 36c. Such selective energization of the field windings 36a and 36b is obtained under the selective control of a relay 46 having the function of switching energizing current from one of the two field windings to the other.

For the purpose of stopping the tuning shaft 11 after it has been rotated to any one of a number of predetermined settings within its rotational range, a plurality of control units 14 are provided, which individually correspond to these settings and are arranged for selective activation under the control of the push buttons 20. One of these units, i. e. the unit 14a is schematically illustrated in Fig. 1 of the drawings as comprising a pair of rotatable camming elements 15a and 16a having the function of determining one predetermined setting of the shaft 11 with approximate and precision accuracy, respectively. These elements have rotational ranges respectively corresponding to the predetermined rotational range of the shaft 11. More specifically, the camming element 16a is carried by the shaft 21 for high speed rotation therewith and has a rotational range several times greater than that of the low speed camming element 15a. The latter camming element is mounted for rotation with a shaft 13 which is driven from the shaft 21 through speed reducing gears 41, 42, 44 and 45. Assuming that the drive ratio between the shafts 21 and 13 is the same as that between the shafts 21 and 11, then the two shafts 13 and 11 have the same rotational ranges. The control unit 14a further comprises a latching element 17a pivotally supported by the stationary shaft 35 and having cam following and locking noses 27a and 34a respectively cooperable with the peripheries of the two camming elements. The nose 34a is also cooperable with the locking shoulder 33a provided along the periphery of the camming element 16a to arrest rotation of the shafts 13 and 21 when these shafts and the connected tuning shaft 11 are rotated to the predetermined position represented by the control unit 14a. Normally the noses 27a and 34a of the latching element 17a are held out of engagement with the peripheries of the two camming elements through the action of a biasing finger 29a which forms a part of a comb-like biasing spring 29 described more fully below, and projects into a recess 28a formed at the lower end of the latching element. The latching element 17a is arranged to be rotated to engage its two noses with the peripheries of the camming elements through energization of an electromagnet 19a. This magnet is arranged to be energized under the control of the push button 20a and coacts with an armature part 18a projecting laterally from the latching element 17a in producing rotation of the latching element. The other four magnets 19b, 19c, 19d and 19e respectively associated with the four other control units 14b, 14c, 14d and 14e, and arranged for selective energization under the control of the push buttons 20b, 20c, 20d, and 20e, are also illustrated in Fig. 1 of the drawing to indicate the selective shaft positioning function of the mechanism.

As indicated above, the latching nose 34a is arranged to coact with the latching shoulder 33a to arrest rotation of the shafts 13 and 21. This, of course, means that the two shafts 21 and 13 must be rotated in a counterclockwise direction in order to effect locking engagement of this nose with the shoulder 33a. Further, since the predetermined shaft position represented by the control unit 14a may be approached by rotation of the shafts 13 and 21 in either direction, it is necessary to provide facilities for reversely rotating the various rotatable parts of the mechanism in response to rotation of the shaft 13 in one direction past the predetermined setting to which the control unit 14a corresponds. To this end the camming element 15a is provided with peripheral camming surfaces 22a and 23a of two different diameters. Further to this end, means comprising a rocker bar 50 arranged to be controlled in accordance with the angular setting of any one of the latching elements 17, are provided for selectively energizing the relay 46 to in turn control, on a selective basis, the energization of the two motor field windings 36a and 36b. Specifically, the rocker bar 50 is pivotally supported by the stationary shaft 35, carries a movable contact 52 cooperable with a stationary contact 53, and is biased by means of a coil spring 51 normally to hold the contact 52 out of engagement with the contact 53. Energizing current for the motor 36, the relay 46 and the magnets 19 may be obtained from any suitable current source such, for example, as the battery 54.

Briefly to consider the mode of operation of the present improved mechanism, it may be assumed that it is desired to adjust the tuning means 10 to the particular setting represented by the control unit 14a at a time when the nose 27a is disposed opposite the peripheral surface 22a of the camming element 15a. To effect adjustment of the tuning means 10 to the desired setting, it is only necessary to actuate the push button 20a, thereby to complete an obvious circuit for energizing the magnet 19a and a parallel circuit for energizing the motor windings 36b and 36c through the contacts 47 and 48 of the de-energized relay 46. When thus energized, the motor 36 functions to drive the two shafts 21 and 13 in a clockwise direction, and to drive the tuning shaft 11 toward the desired setting through the driving connection afforded by the slip clutch 55, the gears 38, 39 and 40, and the described gear train 12 interconnecting the shaft 21 with the tuning shaft 11.

In response to energization of the magnet 19a, the latching element 17a is pivoted in a clockwise direction against the biasing action of the spring finger 29a and the coil spring 51 to bring the nose 27a thereof into engagement with the cam surface 22a. Coincident with such rotation of the latching element 17a, the armature part 18a pivots the rocker bar 50 to move the contact 52 toward the stationary contact 53. So long as the nose 27a of the latching element 17a engages the cam surface 22a, however, the rocker bar 50 is not rotated to produce engagement of the contacts 52 and 53.

During the described operation of the mechanism, the camming element 16a is rotated at a speed several times greater than the speed of rotation of the camming element 15a, the particular speed ratio being determined by the stepdown ratio through the gears 41, 42, 44 and 45 interconnecting the shaft 21 with the shaft 13. For example, a speed ratio of 14:1 may be provided between the camming element 16a and the camming element 15a. This, of course, means that the camming element 16a may be required to rotate through several revolutions while the camming surface 22a is being moved beneath the nose 27a. In this regard it is noted that the latching nose 34a is held out of engagement with the cam periphery 30a so long as the opposed nose 27a is riding upon either of the two cam peripheries 22a or 23a.

When the cams 15a and 16a are rotated to the position illustrated in Fig. 1 of the drawings, the latching element 17a is freed for further rotation in a clockwise direction under the influence of the energized magnet 19a. During such rotation of the latching element 17a, the camming elements 15a and 16a are further rotated in a clockwise direction so that the nose 27a engages the leading end of the cam surface 23a to stop the latching element rotation. As this latching element is further rotated in the manner described, the contact 52 is engaged with the contact 53 to complete an obvious circuit for energizing the relay 46. In operating, this relay opens its contacts 47, 48 to de-energize the motor windings 36b and 36c, and closes its contacts 47, 49 to complete a circuit for energizing the field winding 36a in series with the armature winding 36c. Thus, the direction of rotation of the motor 36 is reversed to produce counterclockwise rotation of the shafts 21, 13 and 11. After a small increment of such counterclockwise rotation, the nose 27a rides down the incline 25a, permitting further counterclockwise rotation of the latching element 17a to a position wherein the nose 34a is in the path of movement of the shoulder 33a. The nose 27a thereafter engages the cam shoulder 26a and drops into the notch in this cam, permitting full engagement of the opposite nose 34a with the surface 31a of the camming element 16a. Finally, the camming element 16a is rotated to bring the shoulder 33a against the nose 34a permitting the two noses 34a and 27a to be pulled to the bottom of the notches in the camming elements 16a and 15a under the influence of the energized magnet 19a. When this occurs, the entire mechanism back to the gear 38 of the gear train is locked against further rotation. Operation of the motor 36 continues so long as the push button 20a is depressed, rotation of the motor armature being permitted by slippage between the engaged friction elements of the clutch 55. When the push button 20a is released, the magnet 19a, the relay 46 and the windings 36a and 36c of the motor 36 are deenergized. Upon deenergization of the magnet 19a, the rocker bar 50 and the latching element 17a are retracted to their respective normal positions under the influence of the spring 51 and the biasing finger 29a.

Assume now that at the time the push button 20a is depressed to initiate adjustment of the tuning means 10 to the particular setting corresponding to the control unit 14a, the shaft 13 occupies a setting wherein a segment of the camming surface 23a is opposite the nose 27a of the latching element 17a. In this case, the magnet 19a, when energized, rotates the latching element 17a to bring the nose 27a into engagement with the cam surface 23a and thus rock the bar 50 to a position wherein the contacts 52 and 53 are engaged. Accordingly, the relay 46 is immediately energized in response to operation of the button 20a to produce counterclockwise rotation of the camming elements 15a and 16a. As such rotation of the camming elements proceeds, the nose 27a rides down the incline 25a to permit locking engagement of the cam shoulder 33a with the nose 34a in the exact manner explained above. Thus, in the second case just considered, operation of the tuning means to the setting represented by the control unit 14a is effected without reversing the direction of rotation of the driving motor 36.

From the above explanation it will be understood that regardless of the direction from which the predetermined setting of the shaft 11 is approached, the two camming elements 15a and 16a jointly cooperate with the latching element 17a to arrest rotation of the shaft when the predetermined setting is imparted thereto. Specifically, the low speed camming element 15 has the function of selecting the predetermined shaft setting with approximate accuracy in that it determines the particular revolution of the shaft 21 during which the camming element 16a may be lockingly engaged with the latching element 17a. The last mentioned camming element, on the other hand, determines the predetermined shaft setting with precision accuracy by virtue of the high speed ratio between this element and the shaft 11. Thus, if a speed ratio of 14:1 is provided between the shafts 21 and 11, and a one degree (1°) error is inadvertently obtained in producing locking engagement between the nose 34a and the cam shoulder 33a, an error of only one-fourteenth of a degree occurs in the positioning of the shaft 11. Thus, extreme accuracy may be obtained in stopping the tuning shaft in a desired setting, even though rather wide tolerances are provided in the design of the two camming elements and the latching element. For example, considerable "slop" may be provided between the nose 27a and the shoulder 26a with which this nose is engageable. In fact, and as pointed out below, the camming element 15a is not rigidly locked against rotation relative to the shaft 13, but is only frictionally restrained against free rotation about this shaft. Again, slight discrepancies in the position of the shoulder 33a along the camming element 16a relative to the latching element nose 34a result in only non-appreciable errors in setting the shaft 11 to the particular position to which the control unit 14a corresponds.

Figure 2:
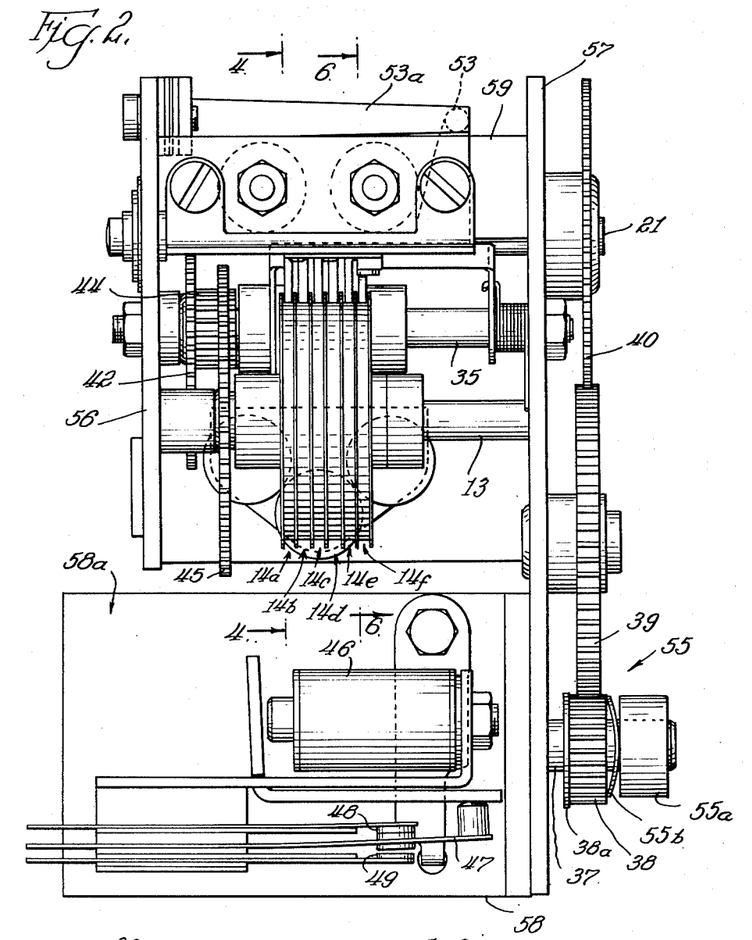
Fig. 2 is a front view of one structural embodiment of the present improved mechanism.
Figure 3:
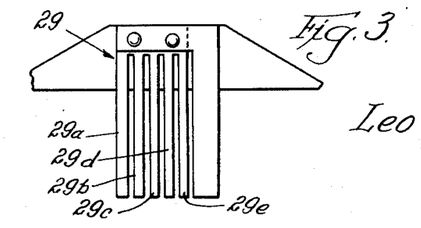
Fig. 3 is a fragmentary detail view illustrating certain parts of the mechanism shown in Fig. 2.

In the mechanical embodiment of the present improved mechanism illustrated in Figs. 2 to 10, inclusive, of the drawings, the various components of the several control units 14 are supported by and between two frame members 56 and 57 which are held in spaced apart relationship by means of cross members 59a and 59b and a spacing post 60. As best shown in Fig. 2 of the drawings, the frame member 57 is mounted upon the right end of a motor housing 58 within which the parts of the motor 36 are disposed. The front wall 58a of the motor housing 58 is also employed to support the relay 46 and the contact spring assembly associated with the armature of this relay. The stationary shaft 35 upon which the latching elements 17 are pivotally supported and the two rotatable shafts 13 and 21 extend between the frame members 55 and 57, the two latter shafts having their ends suitably journalled in openings through the frame members. The gears 38, 39 and 40 connecting the motor shaft 37 in driving relationship with the high speed cam shaft 21 are disposed to the side of the frame member 57. More specifically, the gear 38 is rotatably mounted upon the motor shaft 37 and is clutched to this shaft through the slip clutch 55 which comprises a dished spring 55b reacting between the gear 38 and a collar 55a to press the gear 38 against a friction disc 38a which abuts a shoulder provided along the shaft 37. The gears 41, 42, 44 and 45 interconnecting the shaft 21 with the low speed shaft 13 are mounted just inside the frame member 56, with the two gears 42 and 44 being journalled for rotation about the stationary shaft 35.

Figure 5:
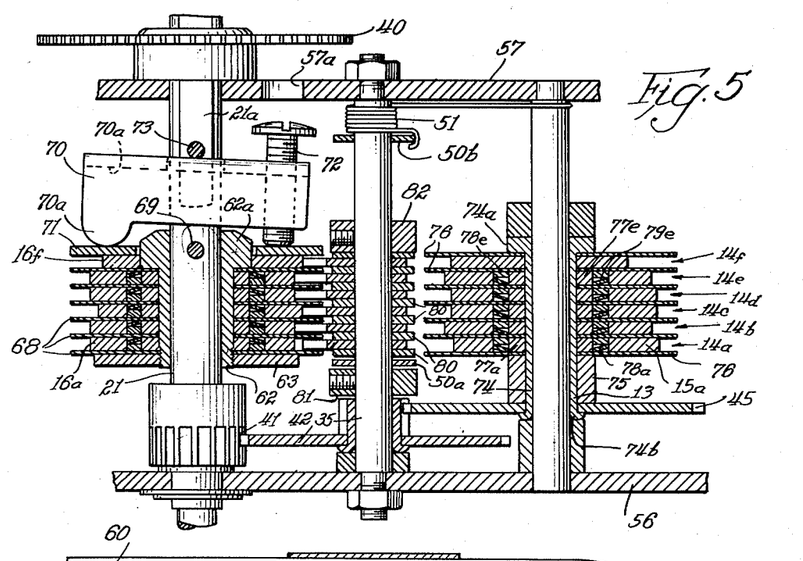
Fig. 5 is a top sectional view taken along the lines 5—5 in Fig. 4.
Figure 6:
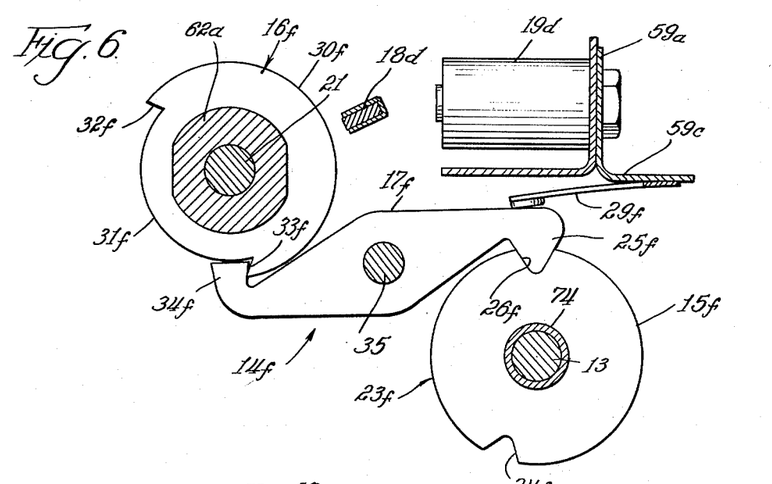
Fig. 6 is a fragmentary sectional view taken along the lines 6—6 in Fig. 2.

As best shown in Figs. 2 and 5 of the drawings, the mechanism comprises five control units 14a, 14b, 14c, 14d and 14e, and a sixth control unit 14f, the details of which are illustrated in Fig. 6 of the drawings, having the function of determining the rotational ranges of the shafts 13 and 21. The camming elements 15 and 16 of the respective control units are respectively carried by the radially spaced shafts 13 and 21. More in detail, the camming elements 16 are arranged in stacked relationship along a sleeve 62 having an enlarged head 63a which is pinned to the shaft 21 by means of a pin 69. These camming elements, together with the camming element 16f, are clamped against rotation relative to the shaft 21 by means of a releasable clamping assembly which comprises a plate 63 threaded on to the left end of the sleeve 62, a floating clamping plate 71 and a clamping lever 70. This lever is of U-shaped cross-sectional configuration and the base wall 70a thereof is apertured to receive the shaft 21 and thus permit rocking engagement of the lever with a pin 73 extending transversely through the shaft 21. In order to prevent relative rotation between the lever 70 and the shaft 21, this shaft is flatted along opposite sides thereof as indicated at 21a and the edges of the aperture through the base wall 70a of the lever are correspondingly flatted to coact with the flats 21a in providing locking engagement between the two parts 70 and 21. A screw 72 threaded through the lever base wall 70a and engageable with the clamping plate 71 is utilized to rock the lever 70 about the pin 73 and thus exert clamping pressure upon the stacked camming elements 16. Access to this screw for screw driver adjustment thereof is permitted through the provision of an aperture 57a in the frame member 57.

The camming elements 16 are held in spaced apart relationship axially of the shaft 21 by means of spacing discs 68 interposed therebetween. Each camming element is of ring-like configuration and is held in a position radially spaced from the sleeve 62 by an assembly of the character illustrated in Figs. 8, 9 and 10 of the drawings. These assemblies include identical parts. In brief, that supporting the camming element 16a comprises an inner ring 64a supporting a floating ring 65a of lesser thickness which is interlocked with the camming element 16a. To obtain the desired interlock between the two last-named parts, the ring 65a is provided with an ear 66a, Fig. 4, which projects into a correspondingly shaped recess provided at the inner edge of the camming element 16a. Thus, the two parts 16a and 65a are locked against relative rotation, but are rotatable as a unit about the parts 64a and 62. A dished spring washer 67a is interposed between the floating ring 65a and the adjacent spacing disc 68 to restrain the elements 16a and 65a against rotation relative to the sleeve 62 when the lever 70 is actuated to relieve the clamping pressure upon the stacked camming elements. This washer is deformed during assembly of the elements upon the sleeve 62 to react between the spacing disc 68 and the ring 65a and thus thrust this ring against the adjacent spacing disc 68.

In the assembly of the mechanism, the described parts 64, 65, 67 and 16 of each control unit are stacked upon the sleeve 62 with the spacing discs 68 interposed therebetween, following which the clamping plate 63 is threaded onto the end of the sleeve 62 to clamp the rings 64 and the inner peripheries of the discs 68 against the sleeve head 62a and thus restrain the parts 62, 64 and 68 against relative rotation. After the mechanism is completely assembled, the camming elements 16 are adjusted to predetermined angular settings relative to the shaft 21 in the manner explained below. These settings are retained by tightening the screw 72 against the clamping plate 71 to pivot the lever 70 about the pin 73 and thus exert clamping pressure upon the plate 71 at two opposed points therearound, such that the camming elements 16 are locked in their adjusted positions against rotation relative to the shaft 21.

Figures 8, 9, 10:
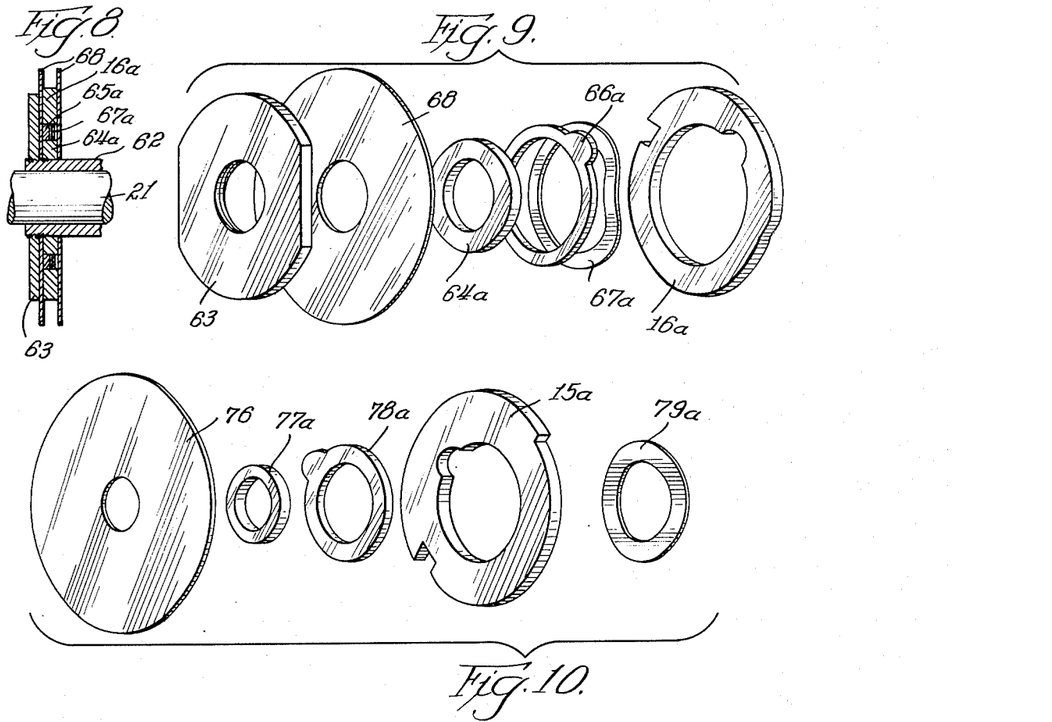
Fig. 8 is a fragmentary detail view in section illustrating the parts making up a part of one of the control units embodied in the mechanism.
Fig. 9 is an exploded view of the control unit parts shown in Fig. 8.
Fig. 10 is an explosion view of the parts making up another part of the control unit partially shown in Fig. 8.
Figure 11:
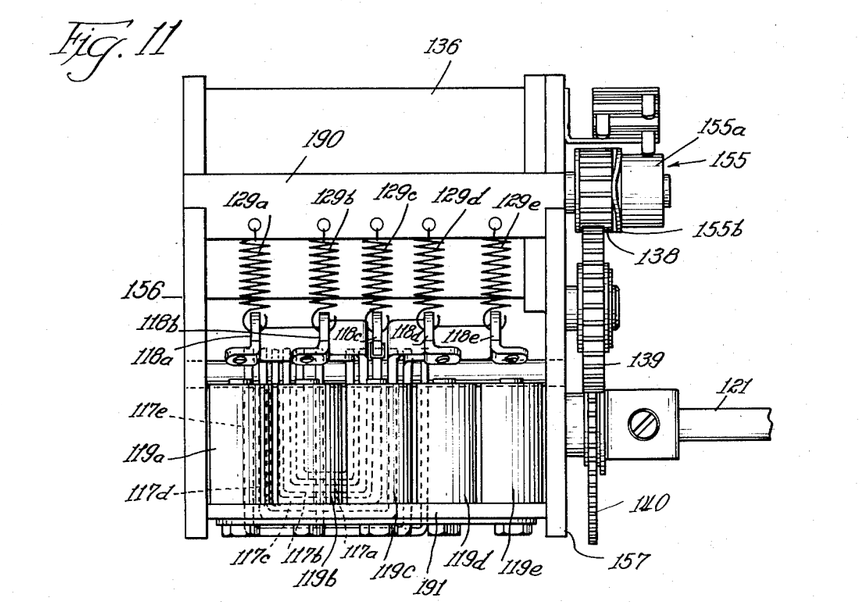
Fig. 11 is a top view of a modified structural embodiment of the present improved mechanism.

As will be evident from a consideration of Figs. 5 and 10 of the drawings, the assemblies for supporting the camming elements 15 upon the sleeve 74 are identical with those for supporting the camming elements 16 upon the sleeve 62. Thus, the parts 15, 77, 78, 79 and 76 carried by the sleeve 74 correspond respectively to the parts 16, 64, 65, 67 and 68 carried by the sleeve 62. A second sleeve 75 interposed between the gear 45 and the left spacing disc 76 is utilized to clamp the stacked discs 76 and inner rings 77 against the head 74a of the sleeve 74 to prevent relative rotation therebetween. In this regard it is noted that aside from the frictional restraining forces provided by the dished spring washers 79, no facilities are provided for restraining the camming elements 15 against rotation relative to the shaft 13. Thus, these elements may be adjusted to desired angular settings relative to the shaft 13, and are retained in these settings solely by the spring washers 79.

Figure 4:
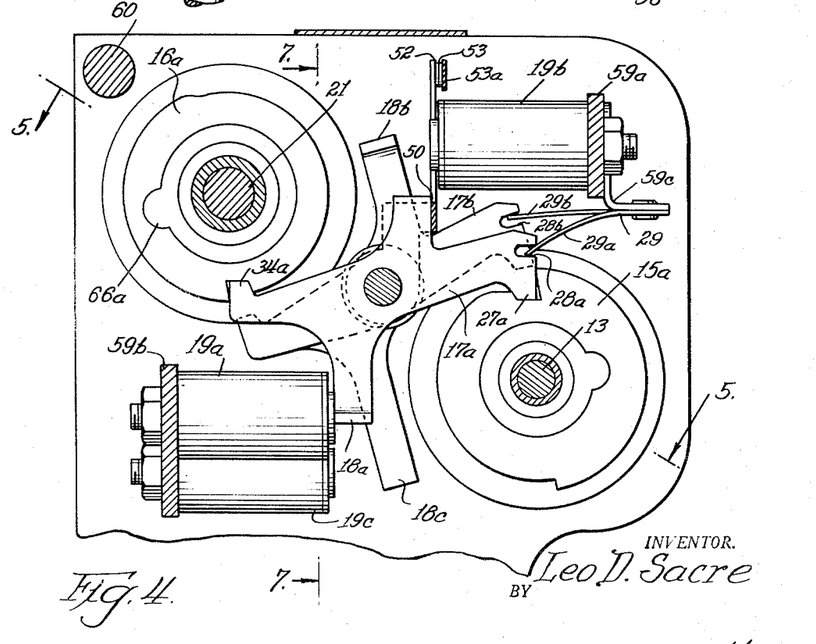
Fig. 4 is a fragmentary sectional view taken along the lines 4—4 in Fig. 2.
Figure 7:
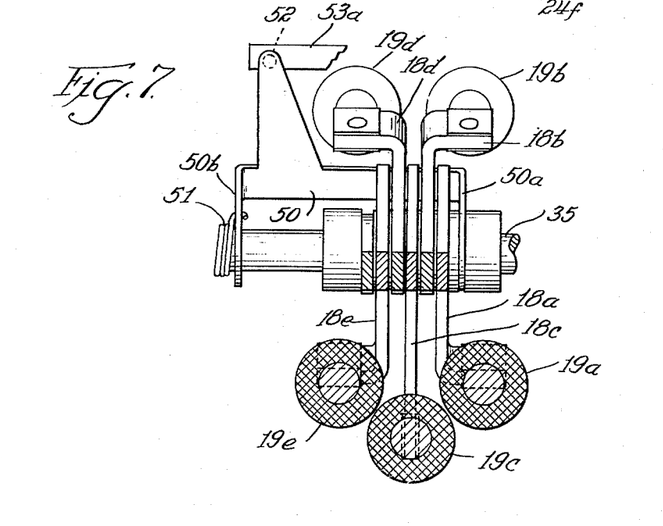
Fig. 7 is a fragmentary view partially in section taken along the lines 7—7 in Fig. 4.

As previously indicated, the latching elements are rotatably supported by the stationary shaft 35. Specifically, these elements are spaced along this shaft with spacing washers 80 interposed therebetween and are held in predetermined positions axially of the shaft by means of collars 81 and 82 set screw mounted upon the shaft. The armature parts 18 of the latching elements project laterally therefrom to positions opposite the pole face ends of the magnets 19. These magnets are mounted in spaced apart positions along the two cross members 59a and 59b of the frame structure. More specifically, and as best shown in Figs. 4 and 7 of the drawings, the two magnets 19b and 19d are mounted upon the cross member 59a, and the armature parts 18b and 18d of the latching elements 17b and 17a respectively extend upward and then laterally in opposite directions for cooperation with the pole face ends of these magnets. The three magnets 19a, 19c, and 19e are similarly mounted upon the cross member 59b beneath the shaft 21. With this arrangement, the armature part 18c of the middle latching element 17c may project straight down for cooperation with the pole face end of the magnet 19c. The armature parts 18a and 18e of the end latching elements, on the other hand, project downward and laterally in opposite directions for cooperation with the pole face ends of the associated magnets 19a and 19e. As shown in dash lines in Fig. 4 of the drawings, the five identified latching elements are normally biased to positions out of engagement with their respectively associated camming elements by means of the fingers 29a, 29b, 29c, 29d and 29e of a resilient comb-like biasing element 29 which is rivet connected to a bracket 59c mounted upon the cross member 59a. The ends of these fingers enter recesses 28 in the noses 27 of the latching elements and each normally occupies the unstressed setting of the finger 29b as shown in Fig. 4 of the drawings. When in this position, the nose ends of each latching element are within the confines of the outer peripheral edges of the spacing discs 68 and 76. Thus, these discs serve to maintain the noses of the latching elements in alignment with their respective associated camming elements. As best shown in Fig. 2 of the drawings, the stationary contact 53 which coacts with the movable contact 52 to control the energization of the reversing relay 46 is carried at the free end of a resilient contact arm 53a mounted upon the frame member 56 and insulated therefrom in any suitable manner.

Referring now more particularly to the control unit 14f which is provided to determine the rotational ranges of the shafts 13 and 21, this unit is illustrated in Fig. 6 of the drawings as comprising a camming element 15f carried by the shaft 13 and a camming element 16f carried directly by the head 62a of the sleeve 62. These two elements are both locked against rotation relative to the shafts 13 and 21 upon which they are respectively mounted. Bridging the two camming elements and cooperable therewith to lock the mechanism against rotation at the respective limits of the rotational ranges of the two shafts, is a latching element 17f which is pivotally supported by the stationary shaft 35. This element has a cam follower nose 25f engaging the periphery of the camming element 15f, and a locking nose 34f engageable with the shoulders 32f and 33f provided at the junctions between the small and large diameter peripheries 31f and 30f of the camming element 16f to determine the limits of the rotational ranges of the two shafts 13 and 21. The latching element 17f is biased toward engagement with the peripheries of the associated camming elements by means of a resilient biasing strip 29f fixedly mounted upon the bracket 59c and having a free end engaging the latching element adjacent the nose end 25f thereof.

The manner in which the various control units 14a, 14b, 14c, 14d and 14e individually function to determine different predetermined settings of the shaft 11 is exactly the same as explained above with reference to Fig. 1 of the drawings. In this regard it will be understood that the control units are selectively activated to determine the positions imparted to the shaft 11 during operation of the mechanism through selective operation of the push buttons 20 to selectively energize the magnets 19. It will also be understood that the control units are mutually non-interfering. Thus, the latching elements 17 are restrained out of engagement with their associated camming elements by their biasing fingers 29 so long as their respective associated magnets 19 are deenergized. Accordingly, when any one of the magnets is energized, only the associated latching element is rotated to a setting which will ultimately result in stopping of the shaft in the particular angular position corresponding to the operated magnet.

As previously indicated, the camming elements 15 and 16 of each control unit are adjustable relative to the shafts 13 and 21, respectively, to change the predetermined tuning shaft setting to which the control unit corresponds. Thus, in order to change the shaft setting represented by the control unit 14a, the clamping screw 72 is first unscrewed sufficiently to permit relative rotation between the camming elements 16 and the shaft 21. Following this operation, the push button 20a is depressed to effect operation of the mechanism to a setting wherein the latching element noses 34a and 27a are fully engaged with the shoulders 33c and 26a, all in the exact manner explained above. Following this operation, and with the magnet 19a still energized, the shaft 11 is manually operated to the particular setting which it is desired to thereafter obtain automatically through operation of the control unit 14a. During such rotation of the shaft 11 and the elements connected in driving relationship therewith, the camming elements 16a and 15a are held against rotation by the latching elements 17a. Specifically, the ring 64a which is locked to the shaft 21, is rotated within the ring 65a which is interlocked with the camming element 16a. Similarly, the inner ring 77a which is locked to the shaft 13 for rotation therewith, is rotated within the spacing ring 78a which is interlocked with the camming element 15a. Since all of the spacing discs 68 and 76 are likewise rotated with the shafts 21 and 13, the camming elements, other than the elements 15a and 16a, are rotated with their respective shafts due to the frictional locking provided by the spring washers 67 and 79. Thus, only the positions of the camming elements 16a and 15a relative to the shafts 21 and 13 are changed in response to manual operation of the mechanism. After the mechanism has been operated to impart the desired setting to the tuning means 10, as determined by the particular station which it may be desired to receive, the push button 20a may be released to effect deenergization of the magnet 19a and resulting release of the latching element 17a. The camming elements of the other four control units may be similarly adjusted as desired for the purpose of changing the predetermined tuning shaft settings respectively represented thereby. After all such adjustments are completed, the screw 72 may be threaded into the lever 70 for the purpose of relocking the camming elements 16 against rotation relative to the shaft 21.

Referring now more particularly to the manner in which the control unit 14f functions to determine the rotational ranges of the shafts 13 and 21, it is pointed out that these rotational ranges are determined by the angular spacing between the recesses 24f and 26f with which the camming nose 25f of the latching element 17f is engageable. Thus, so long as this nose is engaging the cam 15 at a point along the peripheral segment 23f thereof, the locking nose 34f is held in a position away from the large diameter periphery 30f of the locking cam 16f. Accordingly, both of the shafts 13 and 21 are free to rotate. Assume now that the shafts 13 and 21 are rotating in a counterclockwise direction and that such rotation is continued until the nose 25f enters the recess 26f in the camming element 15f. As this nose approaches the bottom of the recess 26f, the locking nose 34f is moved into the path of movement of the shoulder 33f to engage the same and stop operation of the mechanism and thus define one limit of the rotational range of each of the two shafts 21 and 13. In a similar manner, if the two shafts are rotated in a clockwise direction to effect seating of the cam nose 25f within the recess 24f, the locking nose 34f is moved into the path of rotation of the shoulder 32f to engage this shoulder and thus arrest the operation of the mechanism. It will thus be evident that the camming element 15f functions as a gauging element in the sense that it determines the particular revolution at which the locking nose 34f of the latching element 17f shall be moved into the path of rotation of one of the two shoulders 32f and 33f. The camming element 16f, on the other hand, actually performs the function of locking the mechanism against further operation. Since the latter camming element is rotated through a rotational range several times greater than the range of rotation of the camming element 15f, it will be understood that the described control unit functions to determine the limits of the shaft rotation ranges with a high degree of accuracy. Also, since the elements 14f and 16f are adjustable on the two shafts, the limits of the rotational ranges may be shifted as desired and in the manner described above with reference to adjustment of the camming elements 15 and 16.

Referring now more particularly to Figs. 11 to 15, inclusive, of the drawings, the modified structural embodiment of the present improved mechanism there shown is functionally identical with that illustrated in Figs. 2 to 8, inclusive, and described above. Accordingly, corresponding parts of the two structures have been identified by reference numerals having the same units and tens digits, but differentiated by the addition of the hundreds digit one to the reference numbers identifying the parts of the modified mechanism. Thus, the frame members 156 and 157 correspond respectively to the frame members 56 and 57 of the first structural embodiment described above.

In general, the arrangement illustrated in Figs. 9 through 13 differs from that of the first described structure in that all parts of the five control units 114 are arranged in axial alignment along the high speed shaft 121. This, of course, necessitates a different structural version of the latching elements 117 and a correspondingly different arrangement of the operating magnets 119 individual to the five control units. Specifically, the sleeve 175 upon which the low speed camming elements 115 are adjustably supported, together with the driving gear 145 for this sleeve are journalled for free rotation about the high speed shaft 121, the gear 145 being connected to be driven from the shaft 121 by means of the gears 141, 142 and 144. The structural arrangement of the sleeve 175 and the parts carried thereby for adjustably supporting the camming elements 115 is exactly the same as the structure included in the first embodiment of the mechanism to support the camming elements 15. Similarly, the composite ring and spring washer structure for adjustably supporting the high speed camming elements 116 upon the sleeve 162 is an exact duplicate of the above-described structure for supporting the camming elements 16 upon the sleeve 62. Further, the camming elements 115 and 116 per se are identical in peripheral pattern with the camming elements 15 and 16. In the second embodiment of the mechanism, however, a slightly modified arrangement is provided for releasably locking the camming element 116 against rotation relative to the shaft 121. Specifically, this arrangement comprises a centrally apertured cup-shaped clamping member 192 telescoped over the shaft 121 and having its periphery pressed against the right spacing disc 168 by axial thrust exerted thereon through a sleeve 193. The required thrust is produced by means of an adjustable camming element 194 of U-shaped cross section having legs which straddle the extended end of the shaft and engage flats 121a along opposite sides thereof to prevent rotation relative to the shaft. This camming element presses against the right end of the sleeve 193 through the hub 140d which supports the driving gear 140. It is provided with camming edges 194a formed along the two legs thereof which are engageable with a pin 195 to produce axial movement of the sleeve 193 in response to lateral movement of the element 194 relative to the shaft. A screw 197 threaded into the base portion of the element 194 and having an end engageable with the side of the shaft 121 is provided to produce the required lateral movement of the element 194 relative to the shaft. A U-shaped retaining member 196 straddles the camming element 194 and has apertured leg ends cooperating with the shaft 121 to retain the camming element 194 on the shaft. With the described arrangement, movement of the pin 195 up the camming edges 194a of the element 194 is produced when the screw 197 is threaded into the base leg of this element. Thus, the element 194 is moved to the left from the position shown in Fig. 10 of the drawings to exert an axial thrust upon the clamping element 192 through the gear hub 140a and the sleeve 193. This thrust serves to clamp the camming elements 116 against the plate 163 and thus prevent rotation of these elements relative to the shaft 121. Conversely, as the screw 197 is screwed away from the shaft 121, the pin 195 rides down the camming edges 194a to relieve the thrust exerted upon the clamping element 192 through the sleeve 193 and thus release the camming elements 116 for rotation relative to the shaft 121.

Figure 12:
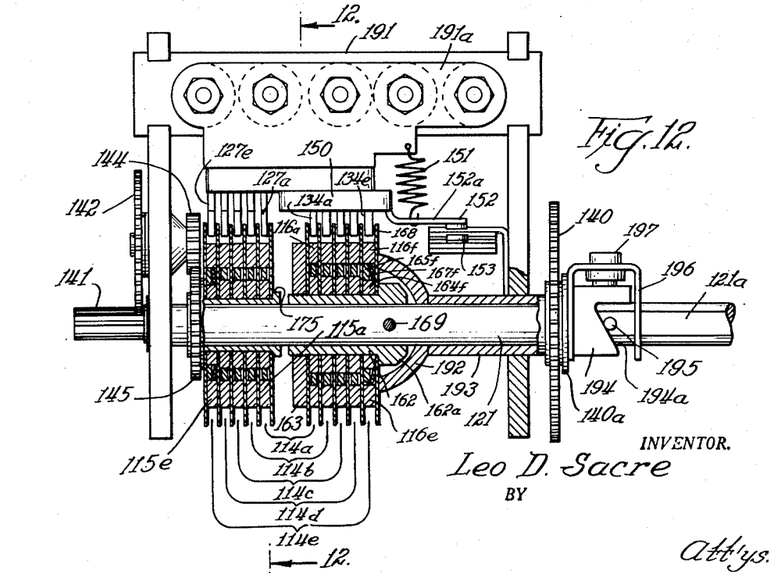
Fig. 12 is a front view partially in section illustrating further details of the mechanism shown in Fig. 9.
Figure 13:
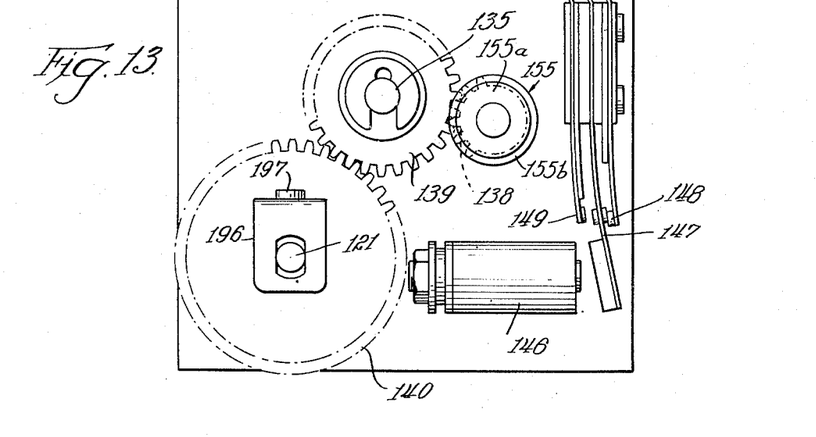
Fig. 13 is a side view of the mechanism shown in Fig. 9.
Figure 14:
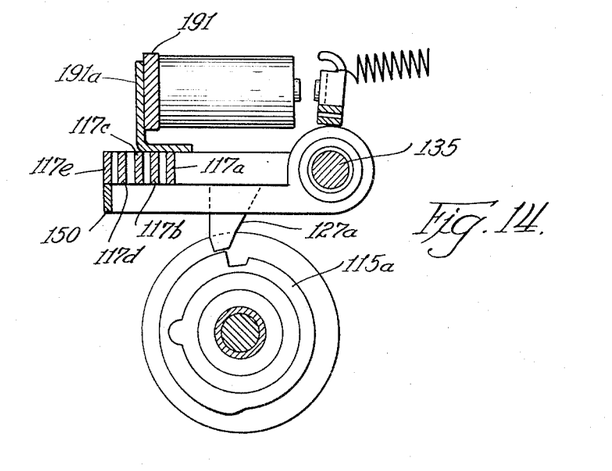
Fig. 14 is a fragmentary detail view in section taken along the lines 12—12 in Fig. 10.
Figure 15:
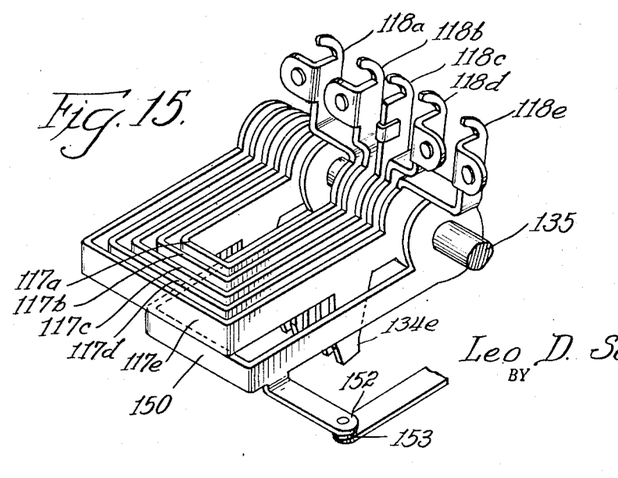
Fig. 15 is a perspective view better illustrating certain of the parts of the modified mechanism.

As best shown in Figs. 14 and 15 of the drawings, the latching elements 117, which are cooperable with the camming elements 115 and 116 to arrest operation of the mechanism in the manner explained above, are in the form of internested U-shaped members having their leg ends pivotally supported upon the stationary shaft 135. The camming and locking noses 127 and 134 of these elements are formed integral with the opposite legs thereof to project downwardly in radial alignment with the respectively associated camming elements 115 and 116. Thus the noses 127a and 134a of the inner latching element 117a are illustrated in Figs. 12 and 14 of the drawings as projecting downward from the legs of this element in radial alignment with the camming elements 115a and 116a. Similarly, the outer latching element 117e is provided with camming and locking noses 127e and 134e projecting downward from the legs thereof to overlie the peripheries of the camming elements 115e and 116e respectively. The latching elements 117 are also provided with upwardly extending armature pieces 118 which are respectively cooperable with the associated magnets 119 to pivot the latching elements on a selective basis to positions wherein the camming and locking noses thereof are engageable with the peripheries of the associated camming elements 115 and 116. Specifically, these armature parts are structurally so arranged that the armature ends thereof are disposed in alignment and in spaced apart relationship between the frame members 156 and 157. The associated magnets 119 are similarly arranged in alignment between the two frame members and are mounted upon a cross member 191 extending between these frames members. Normally, the latching elements 117 are restrained in retracted settings, wherein the legs thereof engage the base of an L-shaped stop bracket 191a carried by the cross member 191, by means of coil springs 129 tensioned between the armature parts 118 thereof and a second cross member 190 extending between the two frame members 156 and 157. The rocker bar 150 which carries the movable motor reversing contact 152 extends beneath the nested latching elements 117 and is pivotally supported by the stationary shaft 135, so that when any one of the latching elements is operated, the rocker bar is correspondingly actuated to control the setting of the movable contact 152. This rocker bar is normally held in its retracted position by means of a coil spring 151 tensioned between the bracket 191a and the arm 152a upon which the contact 152 is mounted. As best shown in Fig. 13 of the drawings, the motor reversing relay 146 and the contact spring assembly associated therewith are fixedly mounted upon the frame member 157 to the outside thereof.

As indicated above, the mode of operation of the described second embodiment of the mechanism is exactly the same as explained above with reference to Fig. 1 of the drawings. Thus, when any one of the magnets 119 is energized to select a predetermined setting which is to be imparted to the shaft 121, the motor 136 supported between the frame members 156 and 157 is energized to drive the shaft 121 at relatively high speed through the driving connection afforded by the clutch 155 and the meshing gears 138, 139 and 140. Such rotation of the shaft 121 results in low speed rotation of the sleeve 175 through the driving connection afforded by the gears 141, 142, 144 and 145. Concurrently with energization of the motor 136, the selected magnet 119 operates to rotate the associated latching elements 117 so that the camming and locking noses 127 and 134 thereof are operatively associated with the peripheries of the associated camming elements 115 and 116. From this point on, the operation of the mechanism proceeds in the exact manner explained above, it being noted in this regard that the initial direction of rotation of the motor is determined by the setting initially imparted to the movable contact 115, and that reverse rotation of the motor may or may not be required, depending upon the setting of the shaft 121 at the time operation of the mechanism is initiated. The manner in which the settings of the camming elements 115 and 116 relative to the sleeves 175 and 162 may be changed to change the tuning shaft settings obtainable under the control of the five control units is exactly the same as explained above with reference to the first embodiment of the mechanism. It will be noted that in the second embodiment of the mechanism no control unit is provided for determining the limits of the rotational ranges of the two shafts 113 and 121. Such a unit may be provided if required, however, in a manner entirely evident from the preceding explanation.

While there have been described what are at present considered to be the preferred embodiments of the invention, it will be understood that various modifications may be made therein which are within the true spirit and scope of the invention as defined in the appended claims.

I claim:

1. In a mechanism for moving the tuning shaft of tunable wave signaling apparatus to a predetermined setting within a predetermined rotational range, a control unit for stopping said shaft when rotated to said predetermined setting comprising a rotatable camming element having a rotational range corresponding to said predetermined rotational range and operative to determine said predetermined setting of said shaft with approximate accuracy, a latching element having a portion engaging said camming element, driving means for rotating said camming element in either direction, switch means coupled to said latching element for controlling said driving means, said camming element having a portion engaging said portion of said latching element when said camming element is rotated in one direction to a predetermined position corresponding to said predetermined shaft setting, with said portion of said latching element sliding over said portion of said camming element when said camming element is rotated in the other direction past said predetermined position, said camming element operating through said latching element and said switch means to control the direction of rotation of said driving means in accordance with the position of said camming element and being operative to reverse the direction of said driving means when said camming element is rotated past said predetermined position in said other direction, to rotate said camming element in said one direction back to said predetermined position, and rotatable means having a rotational range several times greater than the rotational range of said camming element and cooperable with said latching element when said latching element is operated in said predetermined manner to stop rotation of said camming element when rotated precisely to said predetermined position.

2. A mechanism for moving the tuning shaft of tunable wave signaling apparatus to any one of a number of different predetermined settings within a predetermined rotational range, comprising a pair of rotatable members having rotational ranges respectively corresponding to said predetermined rotational range, the rotational range of one of said members being several times greater than the rotational range of the other of said members, control units respectively corresponding to said predetermined shaft settings and individually including rotatable elements respectively carried by said members, the rotatable elements carried by said other member being respectively operative to determine said predetermined shaft settings with approximate accuracy and the rotatable elements carried by said one member being respectively operative to determine said predetermined shaft settings with precision accuracy, means for driving said members at different speeds respectively commensurate with their respective rotational ranges, control means for said driving means for controlling the direction of rotation thereof, selectively operable latching elements individual to said control units and respectively engageable with the rotatable elements thereof to lock said members against relative rotation in predetermined positions respectively corresponding to said predetermined shaft settings in response to rotation of said members to said predetermined positions in one direction only, said control means being coupled to said latching elements and operated thereby to control the direction of rotation of said driving means in accordance with the positions of said rotatable elements with respect to said predetermined positions, said control means operating to reverse said driving means to thereby reverse the direction of rotation of said members in response to rotation of said members in the other direction through positions corresponding to any operated one of said latching elements.

3. A mechanism for moving the tuning shaft of tunable wave signaling apparatus to any one of a number of different predetermined settings within a predetermined rotational range, comprising a pair of radially spaced rotatable members having rotational ranges respectively corresponding to said predetermined rotational range, the rotational range of one of said members being several times greater than the rotational range of the other of said members, control units respectively corresponding to said predetermined shaft settings and individually including rotatable elements respectively carried by said members, the rotatable elements carried by said other member being respectively operative to determine said predetermined shaft settings with approximate accuracy and the rotatable elements carried by said one member being respectively operative to determine said predetermined shaft settings with precision accuracy, means for driving said members at different speeds respectively commensurate with their respective rotational ranges, control means for said driving means for controlling the direction of rotation thereof, latching elements individual to said control units and bridging the rotatable elements thereof, said latching elements being selectively operable to lock said members against relative rotation in different predetermined positions respectively corresponding to said predetermined shaft settings in response to rotation of said members to said predetermined positions in one direction only, said control means being coupled to said latching elements and operated thereby to control the direction of rotation of said driving means in accordance with the positions of said rotatable elements associated with an operated latching element, said control means operating to reverse the direction of said motor and thereby reverse the direction of rotation of said members in response to rotation of said members in the other direction through said predetermined positions corresponding to the operated one of said latching elements.

4. A mechanism for moving the tuning shaft of tunable wave signaling apparatus to any one of a number of different predetermined settings within a predetermined rotational range, comprising a pair of coaxial and rotatable members having rotational ranges respectively corresponding to said predeterined rotational range, the rotational range of one of said members being several times greater than the rotational range of the other of said members, control units respectively corresponding to said predetermined shaft settings and individually including rotatable elements respectively carried by said members, the rotatable elements carried by said other member being respectively operative to determine said predetermined shaft settings with approximate accuracy and the rotatable elements carried by said one member being respectively operative to determine said predetermined shaft settings with precision accuracy, means for driving said members at different speeds respectively commensurate with their respective rotational ranges, and internested U-shaped latching elements individual to said control units, said latching elements being selectively operable to engage the rotatable elements of their associated control units and thus arrest rotation of said members in different positions respectively corresponding to said predetermined shaft settings.

5. A mechanism for moving the tuning shaft of tunable wave signaling apparatus to any one of a number of different predetermined settings within a predetermined rotational range, comprising a pair of coaxial and rotatable members having rotational ranges respectively corresponding to said predetermined rotational range, the rotational range of one of said members being several times greater than the rotational range of the other of said members, control units respectively corresponding to said predetermined shaft settings and individually including rotatable elements respectively carried by said members, the rotatable elements carried by said other member being respectively operative to determine said predetermined shaft settings with approximate accuracy and the rotatable elements carried by said one member being respectively operative to determine said predetermined shaft settings with precision accuracy, means for driving said members at different speeds respectively commensurate with their respectively rotational ranges, internested U-shaped latching elements individual to said control units and bridging the rotatable elements thereof, said latching elements being selectively operable to lock said members against relative rotation in different predetermined positions respectively corresponding to said predetermined shaft settings in response to rotation of said members to said predetermined positions in one direction only, said members being rotatable in either direction toward any one of said predetermined positions, and means controlled by any operated one of said latching elements for reversing the direction of rotation of said members in response to rotation of said members in the other direction through positions corresponding to the operated one of said latching elements.

6. A mechanism for moving the tuning shaft of tunable wave signaling apparatus to a predetermined setting within a predetermined rotational range, including in combination, a pair of elements rotatable at different speeds to predetermined relative positions corresponding to said predetermined shaft setting and respectively operative to determine said predetermined setting of said shaft with approximate and precision accuracy, driving means for rotating said shaft and said elements in either direction, latching means having portions for engaging said rotatable elements, and control means for said driving means operated by said latching means for causing said driving means to rotate said elements from any position toward said predetermined positions in the direction to reach said predetermined positions with the least movement, said rotatable elements having portions adapted to interlock with said portions of said latching means and prevent further rotation thereof when said rotatable elements are rotated in one direction to said predetermined positions, said portions of said rotatable elements and said latching means being shaped so that said latching means slides over said rotatable elements to permit continued rotation thereof through said predetermined positions when said rotatable elements are rotated in the direction opposite to said one direction, one of said rotatable elements operating said control means through said latching means for causing said driving means to reverse direction when said one rotatable element rotates through said predetermined position in said opposite direction so that said rotatable elements reverse and rotate in said one direction to said predetermined positions.

7. A mechanism for moving the tuning shaft of tunable wave signaling apparatus to a predetermined setting within a predetermined rotational range, including in combination, a pair of elements rotatable at different speeds to predetermined relative positions corresponding to said predetermined shaft setting and respectively operative to determine said predetermined setting of said shaft with approximate and precision accuracy, driving means for rotating said shaft and said elements in either direction, and control means for said driving means operatively connected to said rotatable element which determines the approximate setting of said shaft for causing said driving means to rotate said elements from any position toward said predetermined positions in the direction to reach said predetermined positions with the least movement, said control means having portions interlocking with said portions of said rotatable elements for preventing further rotation thereof when said rotatable elements are rotated in one direction to said predetermined positions, said portions of said control means being shaped to slide over said rotatable elements so that said rotatable elements continue through said predetermined positions when said rotatable elements are rotated in the direction opposite to said one direction, said rotatable element which determines the approximate setting of said shaft operating through said control means to cause said driving means to reverse direction when said rotatable elements rotate through said predetermined positions in said opposite direction so that said rotatable elements reverse and rotate in said one direction to said predetermined positions.

LEO D. SACRE.

REFERENCES CITED

The following references are of record in the file of this patent:

UNITED STATES PATENTS

| Number | Name | Date |
| --- | --- | --- |
| 2,153,865 | Gersch | Apr. 11, 1939 |
| 2,249,753 | Elliott | July 22, 1941 |
| 2,285,414 | Collins | June 9, 1942 |
| 2,320,867 | Hill | June 1, 1943 |
| 2,391,470 | May | Dec. 25, 1945 |
| 2,526,152 | Paessler | Oct. 17, 1950 |